US006175854B1

(12) United States Patent
Bretscher (10) Patent No.: US 6,175,854 B1
(45) Date of Patent: Jan. 16, 2001

(54) COMPUTER SYSTEM ARCHITECTURE AND METHOD FOR MULTI-USER, REAL-TIME APPLICATIONS

(75) Inventor: John Bretscher, Elgin, IL (US)

(73) Assignee: Ameritech Services, Inc., Hoffman Estates, IL (US)

( * ) Notice: Under 35 U.S.C. 154(b), the term of this patent shall be extended for 0 days.

(21) Appl. No.: 08/661,428

(22) Filed: Jun. 11, 1996

(51) Int. Cl.[7] .............................. G06F 13/38; G06F 15/17
(52) U.S. Cl. .................... 709/201; 709/203; 709/219; 709/229
(58) Field of Search .................................. 709/201, 218, 709/219, 220, 229, 203, 226

(56) References Cited

U.S. PATENT DOCUMENTS

| | | |
|---|---|---|
| 4,223,380 | 9/1980 | Antonaccio et al. . |
| 4,372,558 | 2/1983 | Shimamoto et al. . |
| 4,437,168 | 3/1984 | Yamashita et al. . |
| 4,570,930 | 2/1986 | Matheson . |
| 4,592,546 | 6/1986 | Fascenda et al. . |
| 4,769,771 | 9/1988 | Lippmann et al. . |
| 4,935,870 | 6/1990 | Burk, Jr. et al. . |
| 4,949,248 | 8/1990 | Caro . |
| 4,958,835 | 9/1990 | Tashiro et al. . |
| 4,998,199 | 3/1991 | Tashiro et al. . |
| 5,021,949 | 6/1991 | Morten et al. . |
| 5,051,822 | 9/1991 | Rhoades . |
| 5,072,381 | 12/1991 | Richardson et al. . |
| 5,163,131 | 11/1992 | Row et al. . |
| 5,179,517 | 1/1993 | Sarbin et al. . |
| 5,218,631 | 6/1993 | Katz . |
| 5,251,909 | 10/1993 | Reed et al. . |
| 5,263,723 | 11/1993 | Pearson et al. . |
| 5,273,288 | 12/1993 | Teshima et al. . |
| 5,292,125 | 3/1994 | Hochstein et al. . |
| 5,324,035 | 6/1994 | Morris et al. . |
| 5,340,119 | 8/1994 | Goldfarb . |
| 5,347,477 | 9/1994 | Lee . |
| 5,349,633 | 9/1994 | Katz . |
| 5,351,970 | 10/1994 | Fioretti . |
| 5,355,453 | 10/1994 | Row et al. . |
| 5,379,296 | 1/1995 | Johnson et al. . |
| 5,397,133 | 3/1995 | Penzias . |
| 5,405,151 | 4/1995 | Naka et al. . |
| 5,423,002 | 6/1995 | Hart . |
| 5,428,528 | 6/1995 | Takenouchi et al. . |
| 5,428,608 | 6/1995 | Freeman et al. . |
| 5,428,782 | 6/1995 | White . |
| 5,442,771 | 8/1995 | Filepp et al. . |
| 5,452,468 | 9/1995 | Peterson . |
| 5,475,819 | 12/1995 | Miller et al. . |
| 5,577,210 | 11/1996 | Abdous et al. . |
| 5,588,146 | 12/1996 | Leroux . |

*Primary Examiner*—Mark H. Rinehart
(74) *Attorney, Agent, or Firm*—Brinks Hofer Gilson & Lione (57) ABSTRACT

An architecture is disclosed for a computer system that runs applications serving multiple users. The computer system includes multiple processors, some of which run quick applications, i.e., requiring real time response, while others run applications with less stringent requirements. Each real time processor can be dedicated to running just one instance of an application. The processors can be of disparate types running disparate operating systems and optimized for disparate applications. The system is centrally controlled with the processors communicating among themselves over a shared LAN or via a communications switch. The system may also facilitate simultaneous voice and data communications among users. Users communicate with the system using any of a number of standard techniques: including dial-up telephone lines, ISDN, packet access services, ADSL, cable TV and the like.

14 Claims, 6 Drawing Sheets

COMPUTER SYSTEM ARCHITECTURE AND METHOD FOR MULTI-USER, REAL-TIME APPLICATIONS

FIELD OF THE INVENTION

The present invention is directed to a computer system architecture and method for processing computer applications accessed by multiple users and, more particularly, to a computer system architecture and method for processing multiple-user, real-time applications using dedicated compute servers.

There exist various computer system architectures that provide multiple user access to computer applications. FIGS. 1–5 illustrate such known architectures and will be described in detail. The advantages and disadvantages of these known architectures will be described with reference to their running real-time computer applications and, more particularly, game applications. Of course, other real-time applications can be processed.

Figure 1:
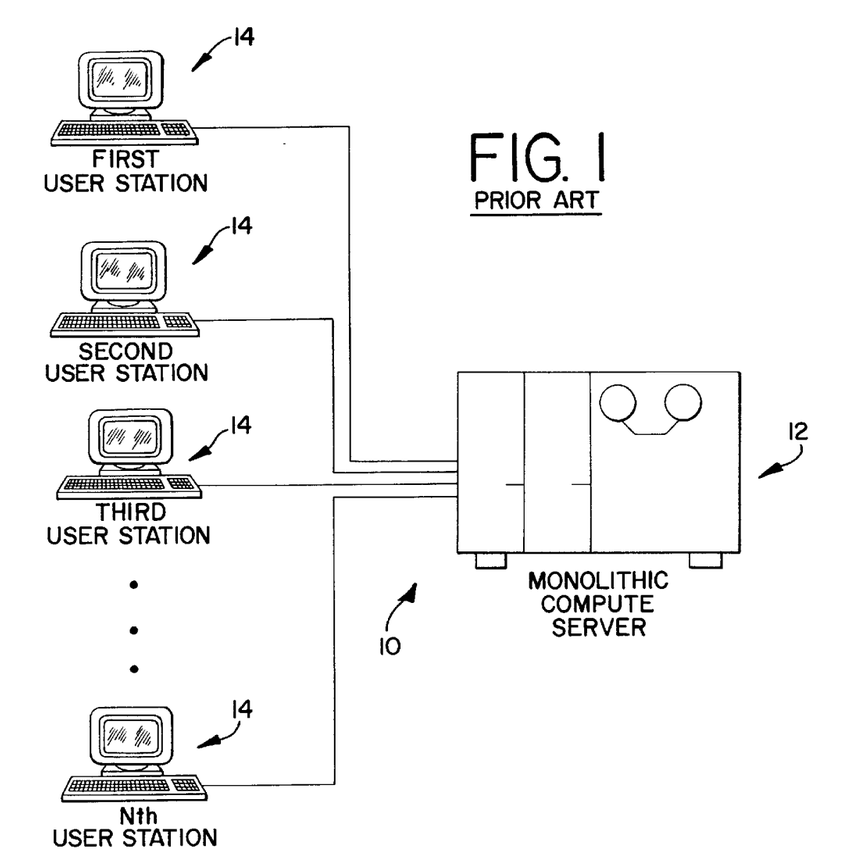
FIG. 1 is a schematic of a monolithic server local access architecture.

FIG. 1 illustrates a monolithic server, local access computer architecture 10. This architecture includes one monolithic compute server 12 and a plurality of user stations 14 locally connected to the compute server 12. Each user station 14 may be a terminal or a computer emulating a terminal. It may even be a simple game input device, for example, a joystick with no display at all. An example of a dedicated game device is the PLAYSTATION available from the Sony Corporation. The sole compute server 12 performs all of the processing needed to run the application. The user stations 14 may all display the same scene or each may display a scene tailored to the particular local user. A popular application of this system is for two users to connect their game input devices into a shared personal computer (PC) or dedicated game device.

Several advantages are associated with this architecture. Dedicated game devices are much cheaper than PCs so this is an inexpensive system to use for playing games. Because many users play games on such a system, there is a large supply and selection of these devices and of compatible games. Since each user station 14 has a dedicated connection, access line latency is both low and fixed. Latency in a communications link measures the time from when a data bit enters the link at the data source to when it leaves the link at the data sink. It is often measured in milliseconds. If the compute server is a dedicated game device, there are no problems with competing applications slowing down the speed of play. Since all processing is performed on one machine, event resolution is not an issue. If the users are all in the same room, they may be able to talk with each other.

There are several disadvantages, however, associated with the monolithic server, local access computer architecture. While users are located close to each other, they may still be far enough apart that they cannot talk to one another during play. In addition, the number of users is limited, often to two with dedicated game devices. If the compute server is not dedicated to one application, applications may compete for processing cycles, thereby affecting each other's performance. In addition, since one compute server 12 does everything, its performance sets limits on the kinds of applications that can be supported. In addition, monolithic compute servers are not flexible in size or through time, and they cannot adapt readily to accommodate changing demand. Thus, once purchased, they may become quickly obsolete.

Figure 2:
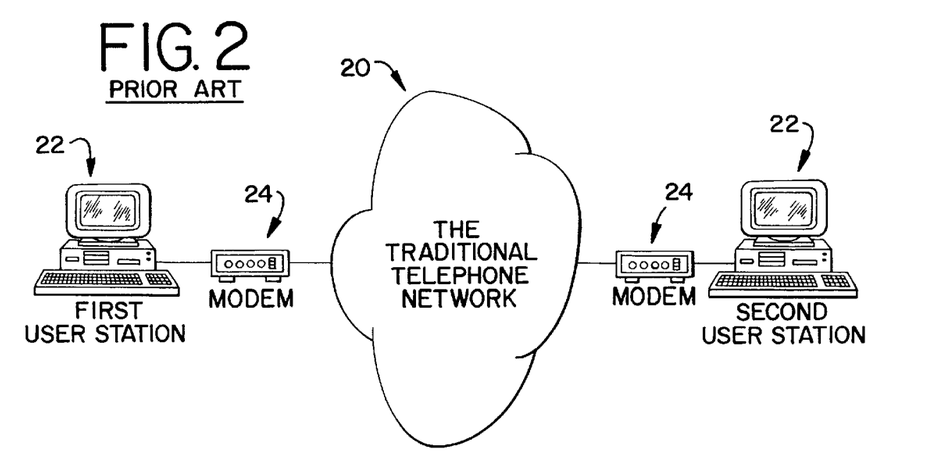
FIG. 2 is a schematic of a modem-to-modem architecture.

FIG. 2 illustrates a modem-to-modem architecture. Two user stations 22 are connected by way of modems 24. Each user station 22 has everything needed to support a single user in a stand-alone application in addition to the ability to drive the modem 24. Usually the user station 22 is a personal computer or dedicated game device. Each user station 22 performs all local processing display functions. Usually one user station 22 (the "master") is chosen to resolve event contentions. To accomplish this the master receives inputs from both the local user and from the remote user, resolves contention between these inputs and decides the temporal progression of the application, and then communicates the status of that progression. The master may tell each station only what it needs to know or may send the complete status to both stations and let each decide how much of that status is relevant to its local display. Alternatively, the event contention resolution function may be shared between the stations.

There are advantages to the modem-to-modem architecture. Although personal computers are expensive compared with dedicated game servers, their purchase is justified by the fact that they have many uses beyond the processing of game applications. Many homes already have a personal computer and a modem so there is little incremental cost involved beyond the application itself and the optional game input device. Also, having the enormous processing power of a personal computer dedicated to one user allows for graphics that are usually beyond the capability of a monolithic server that has to run everything for everybody. In addition, the bandwidth and latency of the dial-in line are fixed and unwavering. Bandwidth is a measure of the rate at which data can be sent over a communications link. It is usually measured in bits per second. In general, it is desirable to have high bandwidth and low latency. In the modem-to-modem architecture, however, bandwidth is fixed at a fairly low value compared with the local access architecture discussed with reference to FIG. 1 and latency is fixed at a fairly high value, again compared with the local access architecture. Because bandwidth and latency vary independently of each other, the applications developers can often effectively mask the fact that the bandwidth is low and latency is high.

In addition, each user controls his own station environment so there should never be contention from competing applications. Also, two people from anywhere in the world can play together and, once the multimode modem standards are complete, can talk with each other while they play. A multimode modem refers to a modem that can transmit voice at the same time and over the same link that it transmits data. If multimode modems are used in the modem-to-modem method, then the application communicates over the data channel while at the same time, the voice channel lets the users talk to each other.

There are, however, disadvantages associated with the conventional modem-to-modem architecture. The number of users is limited to two. The PCs and communications equipment are expensive when compared with dedicated game devices. If event contention resolution is not shared, the master must spend some of its processing power performing this function, possibly to the detriment of the local user. On the other hand, if event contention resolution is shared, latency increases.

Figure 3:
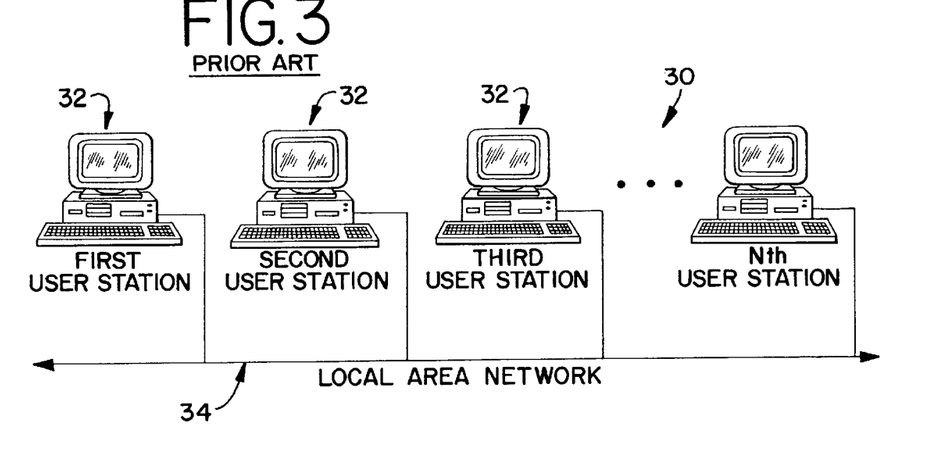
FIG. 3 is a schematic of a local area network architecture.

FIG. 3 illustrates a local area network (LAN) architecture. Several user stations 32 are connected by LAN 34. The number of users is limited by the specific application, usually from four to eight users. The user stations 32 are similar to those described in the modem-to-modem architecture shown in FIG. 2 with the difference that LAN support replaces modem support. The split between local processing and remote processing seen in the modem-to-modem architecture also applies here. Usually, event resolution is accomplished the same way, however, now the master is resolving four to eight users instead of only two. Alternatively, this function can be handled by a separate server on the LAN or shared among user stations.

The LAN architecture has most of the advantages associated with the modem-to-modem architecture. In addition, the LAN architecture allows more than two users to run a single application. As long as the LAN is not overloaded with traffic from other applications, it offers the high bandwidth and low latency that applications developers desire. Also, the LAN's broadcast mode can be used to reduce overall traffic requirements. The processing burden placed upon a user station's central processing unit by the access line is reduced because LAN cards have their own communications processors.

There are, however, several disadvantages associated with the LAN architecture. While users are located relatively close to one another, they may still be far enough apart that they cannot talk to each other. The PCs and communications equipment needed are expensive when compared with dedicated game devices. Few people have access to a LAN, and then often only at work. In any case, it may be difficult to gather enough people to make collaborative applications worthwhile. Latency and bandwidth are both heavily dependent upon the characteristics of traffic on the LAN, which may be subject to enormous variation. The event contention resolution master must deal with more users than in other architectures, possibly to the detriment of the local user.

Figure 4:
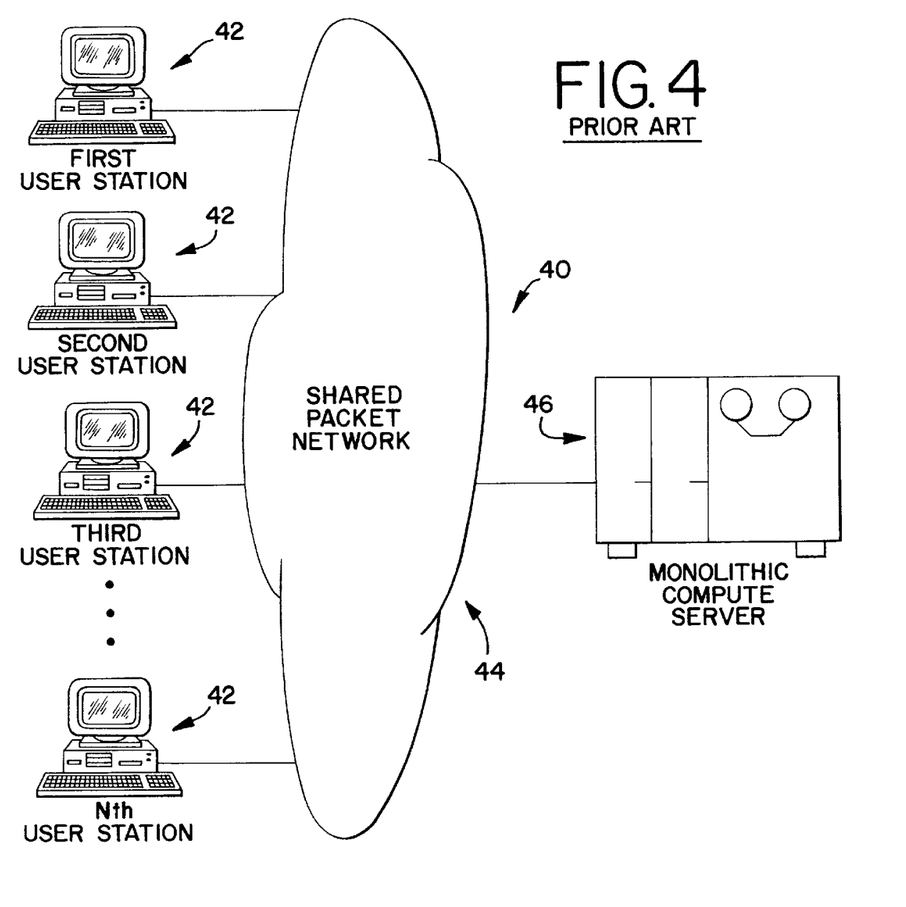
FIG. 4 is a schematic of a monolithic server packet network architecture.

FIG. 4 illustrates a monolithic compute server packet network architecture. The Internet is an example of such an architecture. Several user stations 42 are connected to a shared packet network 44. The number of users is limited by the application, as in the LAN architecture. Typically the user stations 42 are personal computers. There are several ways to connect the user stations 42 to the shared packet network 44, but usually the connection is by modem link to an access server on the network. This access server may, or may not, be the same as the monolithic compute server 46. If it is the same, the architecture is the same as the monolithic server modem access architecture which will be described with reference to FIG. 5.

There are two common application schemes supported by the architecture shown in FIG. 4; a distributed scheme and a centralized scheme. In the distributed scheme, local processing is done in the same way as in the LAN architecture described with reference to FIG. 3. The compute server 46 is the master performing all of the event contention resolution. In the centralized scheme, all processing is done by the compute server 46 and the user stations 42 are mostly dumb input and output devices, just as in the monolithic server, local access architecture described with reference to FIG. 1.

Some of the advantages of PC-based applications described in the modem-to-modem architecture are found in the monolithic compute server packet network architecture and need not be described again. Two additional advantages accrue to the service provider. First, centralized applications do not need any software distribution channels. This makes offering new applications both easy and less of a financial risk. Second, because the shared packet network is used, the compute server can be placed anywhere convenient for the service provider. Unlike the LAN architecture where there is usually no central server, no user station is unfairly shackled with the burden of event contention resolution. Unlike the modem-to-modem architecture and the LAN architecture, more than two people placed anywhere the shared packet network reaches can play together.

There are several disadvantages associated with the monolithic server packet network architecture. If the compute server is not dedicated to one application instance, applications may compete for processing cycles and affect each other's performance. As previously described, monolithic servers are not flexible; cannot be adapted readily to accommodate changing demand; and once purchased, quickly become obsolete. In addition, the PC and communications equipment are expensive when compared with dedicated game devices. Compared with the LAN architecture, each user station must shoulder a greater processing burden in running its access line. Latency and bandwidth are both heavily dependent upon the characteristics of traffic on the packet network which may be subject to enormous variation. For centralized applications, one processor does everything so its performance sets limits on the kinds of applications that can be supported. Depending upon the bandwidth of the access link, there may need to be an outside distribution channel for distributed applications.

Figure 5:
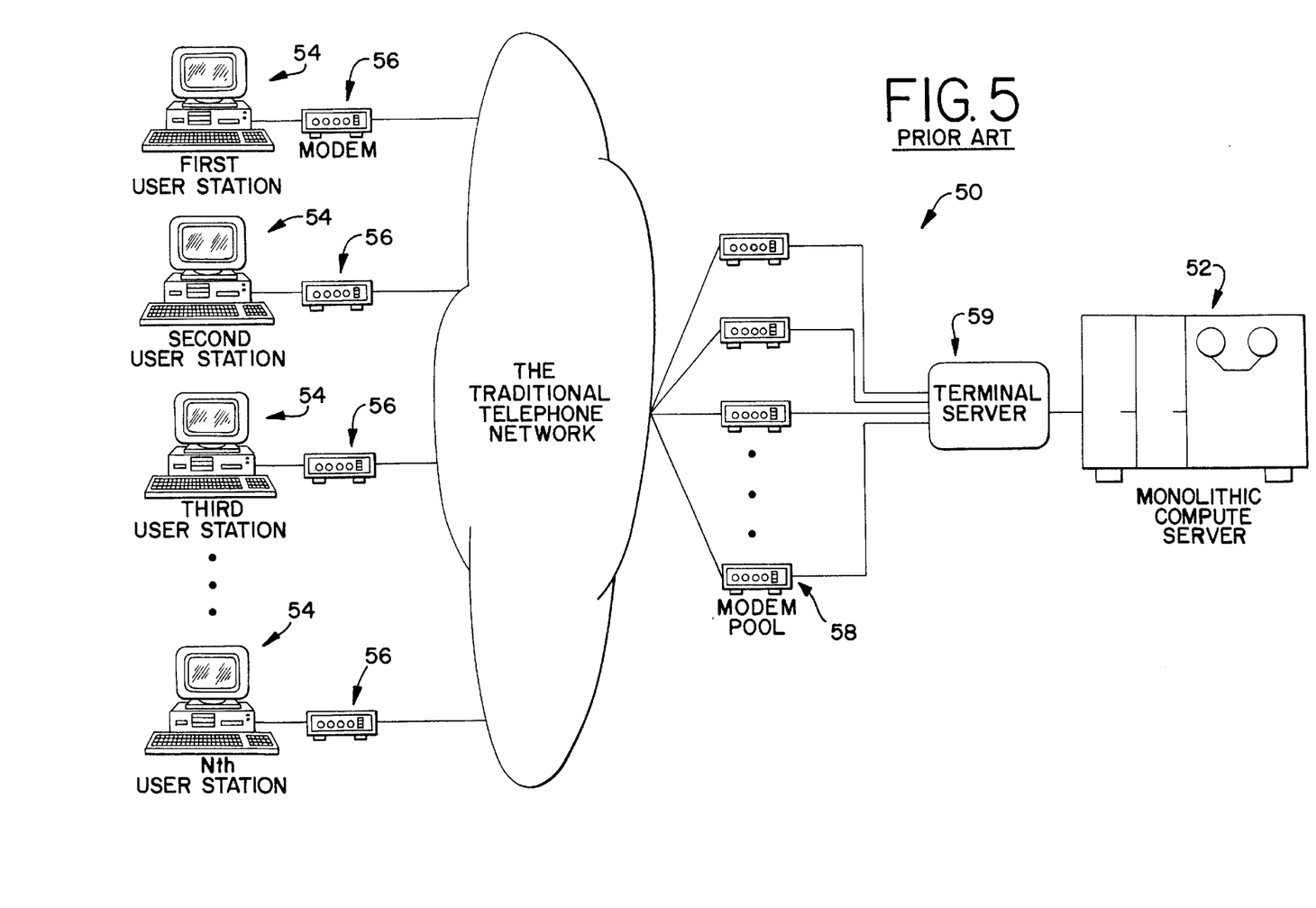
FIG. 5 is a schematic of a monolithic server modem access architecture.

FIG. 5 illustrates a monolithic compute server with modem access architecture. This architecture utilizes a telephone network. On the user side of the telephone network there are a plurality of user stations 54 with a modem 56 connecting each user station 54 to the telephone network. On the service provider side of the telephone network there is a monolithic compute server 52, a modem pool 58, and a terminal server 59.

This architecture differs from that shown in FIG. 4 by the addition of a modem link. By utilizing a modem link the advantages of a dedicated access link described in the modem-to-modem architecture of FIG. 2 are combined with the advantages of the monolithic server packet network architecture of FIG. 4. This is especially beneficial for running "high-twitch" games, (i.e., games that demand very fast response from the players, so fast that the responses of a good player seem more reflexive than calculated). Such games do not fare well under conditions of variable latency which are present in the packet network and LAN architectures.

There are some disadvantages associated with the monolithic server modem access architecture. If the compute server is not dedicated to one application instance, applications may compete for processing cycles and affect each other's performance. Monolithic servers are not flexible; cannot adapt readily to accommodate changing demand; and once purchased, quickly become obsolete. The PCs and communications equipment are expensive when compared with dedicated game devices. Compared with the LAN architecture, each user station must shoulder a greater processing burden in running its access line; the bandwidth of the connection is low and latency may be high. For centralized applications, one processor does everything so its performance sets limits on the kinds of applications that can be supported. Depending upon the bandwidth of the access link, there may need to be an outside distribution channel for distributed applications. Compared with the monolithic server packet network architecture, the economics of the service are much more dependent upon the relationship between the server sites and the incoming user traffic and it is more difficult to economically distribute the service over a wide area.

There may be certain ways to reduce or eliminate some of the disadvantages of the architectures discussed above, however, generally prohibitive cost or labor intensity discourage such efforts.

As already discussed, some architectures require the users to be in close proximity. Depending upon the specific architecture employed, there may be ways to extend the distance allowable between users. For example, LAN bridges can extend the presence of a LAN almost indefinitely, but this may be quite costly on a per user basis.

In other architectures, the number of users is limited or one processor does everything so that its performance sets limits on the kinds of applications that can be supported. For a monolithic server, the number of users may be limited by the server's processing capability or by the number of ports it can support. More powerful servers could alleviate this problem for a while, but no matter how powerful the server is initially, the demands of applications and users will keep growing until the server can no longer keep up, thereby becoming obsolete. Huge servers are also both very expensive and not very cost effective. They are not standardized, so the service provider will be tied into one supplier and one architecture. In addition, administrative overhead must be borne by the service provider. In other architectures, the compute server may not be dedicated to an application and thus multiple applications may compete for processing cycles thereby affecting overall performance.

While particular architectures have been illustrated in FIGS. 1–5, it is clear that other architectures exist which combine features of those architectures specifically shown.

It is thus desirable to provide a computer system architecture that combines the advantages of the known architectures described above while isolating or minimizing any remaining disadvantages so that they can be dealt with most effectively.

It is also desirable to provide a computer system architecture that gives an application developer a more predictable environment to create a real-time experience.

SUMMARY OF THE INVENTION

According to a first aspect of the present invention there is provided a method for processing real-time applications. The method includes the steps of providing a front-end server; providing a plurality of dedicated processors coupled to the front-end server so that the front-end server can communicate with at least one of the plurality of dedicated processors; selecting at least one of the plurality of dedicated processors to execute a selected application and coupling a plurality of users to the at least one of the selected dedicated processor so that the plurality of users can participate in the execution of the selected application.

According to a second aspect of the present invention there is provided a method for processing real-time applications which may be executed by a plurality of users. The method includes the steps of providing a front-end server that has access to a plurality of applications; providing a plurality of dedicated processors that communicate with the front-end server; coupling a first user to the front-end server; sending a message from the user to the front-end server that the user desires to have executed a particular application; retrieving the particular application selected by the user; downloading the particular application selected by the user to a memory in a selected dedicated processor; coupling the user to the selected dedicated processor; and executing the particular application selected by the user on the selected dedicated processor.

According to a third aspect of the present invention there is provided a computer system architecture for processing real-time applications. The architecture includes a front-end server, a plurality of dedicated processors coupled to the front-end server so that the front-end server can communicate with at least one of the plurality of dedicated processors, means for selecting at least one of the plurality of dedicated processors to execute a selected application; and means for coupling a plurality of users to at least one of the selected dedicated processors so that the plurality of users can participate in the execution of the selected application.

According to a fourth aspect of the present invention there is provided a computer system architecture for processing real-time applications. The architecture includes a front-end server having access to a plurality of applications; a plurality of dedicated processors coupled to the front-end server so that the plurality of dedicated processors can communicate with the front-end server; means for coupling a first user to the front-end server; means for sending a message from the user to the front-end server that the user desires to have executed a particular application; means for retrieving the particular application selected by the user and loading the particular application in a memory of the front-end server; means for downloading the particular application stored in the memory of the front-end server to a memory of a selected dedicated processor; means for coupling the first user to the selected dedicated processor; and means for executing the particular application selected by the first user on the dedicated processor.

According to a fifth aspect of the present invention there is provided a computer system architecture for processing real-time applications. The architecture includes a front-end server having access to a plurality of applications; a plurality of dedicated processors coupled with the front-end server, the plurality of dedicated processors and at least one user wherein the user first communicates with the front-end server to select a desired application and the front-end server communicates with a selected dedicated processor and downloads the desired application to the selected dedicated processor which communicates with the user and executes the desired application.

According to a sixth aspect of the present invention there is provided a method for running real-time applications. The method includes the steps of providing a front-end server; providing a plurality of dedicated processors; providing means for interconnecting the front-end server with the plurality of dedicated processors so that they may communicate with one another; and providing a dial-in service to access the means for interconnecting and coupling a user who dials-in to the front-end server to at least one of the dedicated processors.

This invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 6:
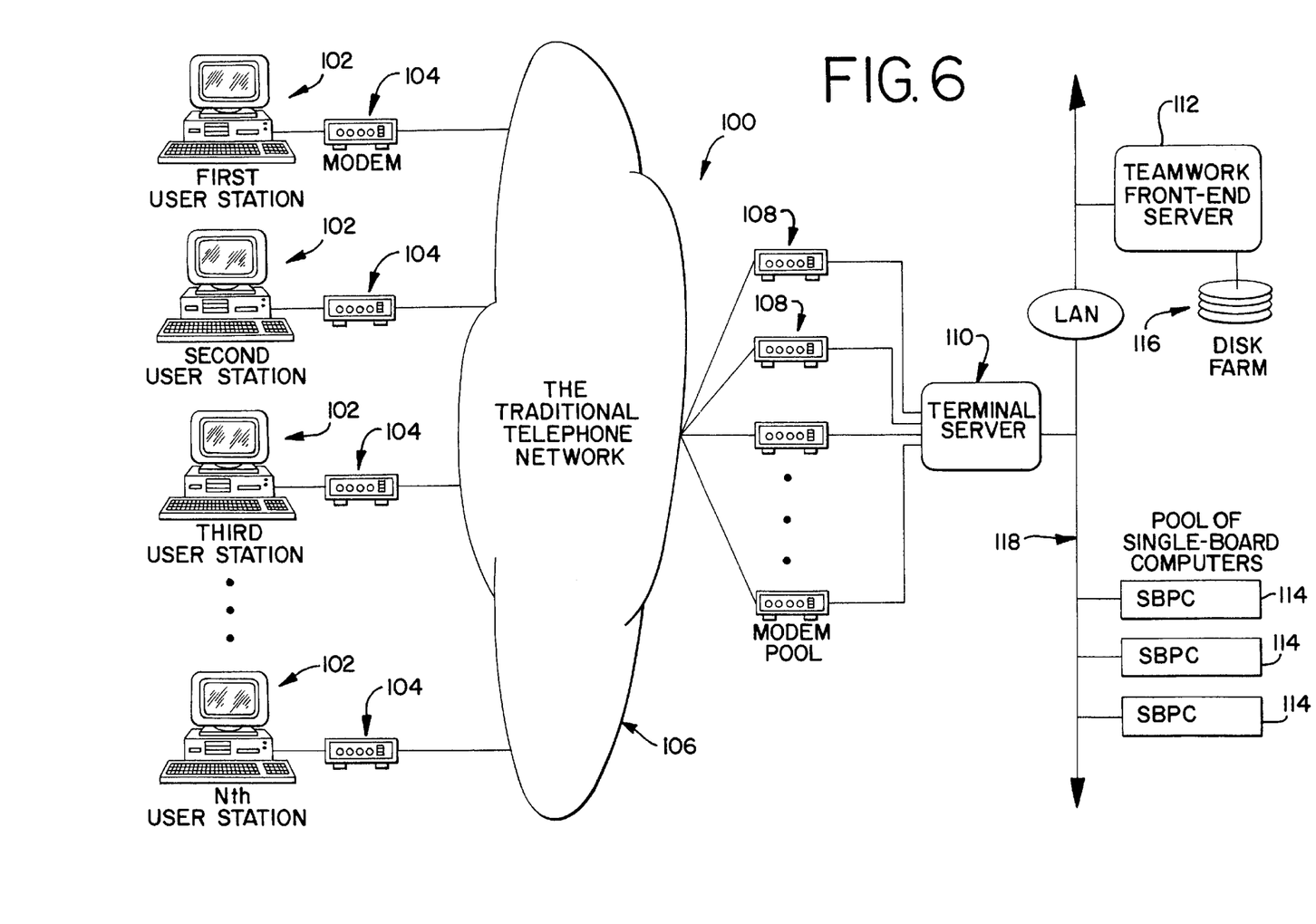
FIG. 6 is a schematic of a computer system architecture according to a first preferred embodiment of the present invention.

FIG. 6 illustrates a computer system architecture according to a first preferred embodiment of the present invention. The computer system architecture 100 includes on the user side, a plurality of user stations 102 and a telephone network 106. Each user station 102 is coupled to the telephone network 106 by an individual modem 104. On the service provider side, the computer system architecture 100 preferably includes a terminal server 110, a local area network (LAN) 118, a front-end server 112, a disk farm 114, and a plurality of dedicated processors 116. A modem pool 108 couples the terminal server 110 to the telephone network 106. The disk farm 114 stores a plurality of applications which can be retrieved by the front-end server 112.

In a preferred embodiment, the plurality of dedicated processors 116 are coupled in parallel with the front-end server 112 by LAN 118. By separating the function of the dedicated processors 116 from the front-end server 112, the application developer gains a more predictable environment to create a real-time experience. As will be described in greater detail hereinafter, when an application or computer program is initiated that requires real-time response, the front-end server 112 selects the application from the disk farm 114 and downloads the selected application or program to one of the dedicated processors 116. The dedicated processor 116 can take on any platform configuration, however, it only runs one application or program at a time as quickly as possible. The function of the dedicated processor 116, therefore, is solely to execute the application or program with no other competing applications or programs. Because there are no competing applications or programs running on the dedicated processor 116, a more realistic real-time response is possible.

The use of such parallel, dedicated processors is thus preferable over a monolithic server previously described which must perform all functions for all users in a timely fashion. In addition, providing dedicated processors to run specific applications or programs eliminates the processing overhead associated with contention resolution for competing applications.

In a preferred embodiment, the method used to access the server complex, while not part of the invention itself, is important to the successful functioning of the system. That method preferably provides an isochronous, full-duplex data channel between each user and the front-end server 112 in order to take full advantage of the architecture's ability to support real-time response applications. A full-duplex channel between the user and the front-end server can be thought of as having two subchannels, one in the "forward" direction from the user to the front-end server and one in the "reverse" direction, from the front-end server to the user. The user and front-end server can each always transmit, regardless of what the other is doing. The traditional telephone network provides such channels. In addition, the Integrated Services Digital Network (ISDN) is an access technology that usually gives an end user two independent digital channels running at 64 Kbps each, suitable for voice or data, and one digital channel running at 16 Kbps, suitable for data and signalling. Packet access technologies also provide a full duplex channel and may in the future provide isochronous channels. Similarly, the data channels are preferably isochronous within the server complex itself and some LAN technologies provide for that. The following LANs may be used: Token Ring, Fiber Distributed Data Interface (FDDI), Ethernet 100BaseT, switched Ethernet, and Asynchronous Transfer Mode (ATM) LANs.

Figure 7:
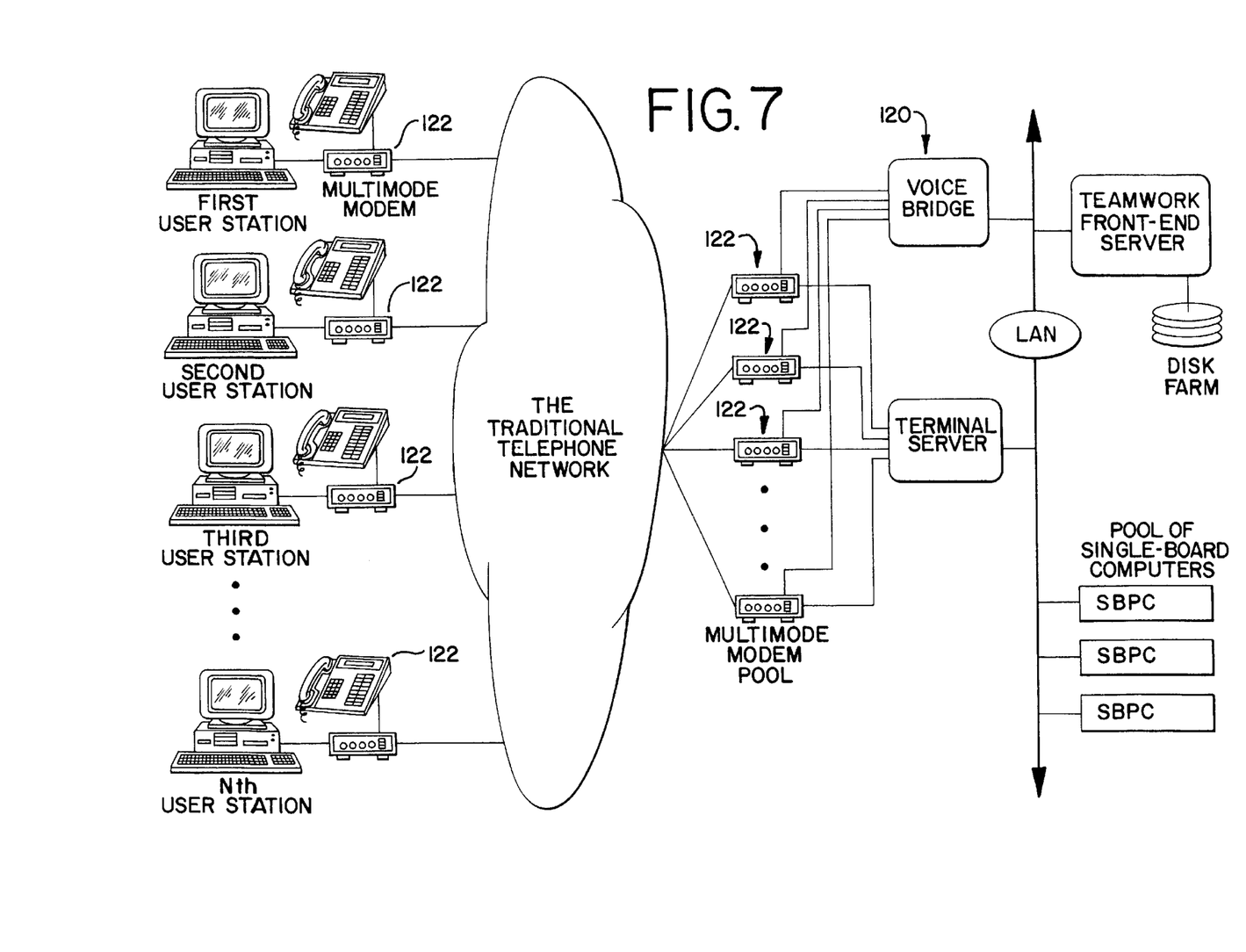
FIG. 7 is a schematic of a computer system architecture according to a second preferred embodiment of the present invention.

FIG. 7 is a schematic of a computer system architecture according to another preferred embodiment of the present invention. The architecture is similar to that shown in FIG. 6 and thus like reference numerals will be used to designate like components. The computer system architecture shown in FIG. 7 now includes a dedicated voice bridge 120. In addition, the modems coupling the user stations 102 to the telephone network 106 and the pool of modems coupling the front-end server 112 to the telephone network 106 are replaced by multimode modems 122. Multi-mode modems are preferably used to allow both data and voice communications over a telephone network. By adding the dedicated voice bridge 120 and multimode modems 122, multiple users may thus verbally communicate with each other while the application or program is being executed on a dedicated processor 116. Alternatively, a voice bridge may be located on one, some, or all of the dedicated processors 116 so that the data and voice streams are not separated.

A prototype of the computer architecture shown in FIG. 7 has been built, representing a preferred embodiment of the invention. The user stations 102, of course, will vary depending on the type of equipment chosen by the user. In the prototype built, one user station 102 was a personal computer based on the Intel Pentium processor, operating at 100 MHz with 32 MBytes of RAM and an 800 MByte hard disk. This user station 102 was also equipped with a quad-speed CD-ROM drive, a 32-bit sound card, and a telephone headset to free the user's hands while speaking into the telephone. A second user station 102 in the prototype was a personal computer based on the Intel 80486 processor, operating at 66 MHz with 4 MBytes of RAM, a 400 MByte hard disk, a dual-speed CD-ROM drive, a 16-bit sound card, and a telephone headset. Both user stations 102 were equipped with Multi-Tech model MT2834PCS multimode modems from Multi-Tech of Mounds View, Minn.

The prototype used a Hewlett-Packard model 735/125 workstation running the HP-UX operating system for the front-end server 112, and for the terminal server 110. The modem pool 108 employed Multi-Tech model MT2834PCS multimode modems, and was connected to the terminal server 110 using a serial interface and a RS-232C connection. In the prototype, the LAN 118 coupling the front-end server 112 and the plurality of dedicated processors 116 was an Ethernet LAN.

The voice bridge 120 in the prototype was a compute platform with an MVIP bus running the UNIX operating system. An 8-port analog voice board (AG-8 from Natural MicroSystems of Natick, Mass.) and an XDS/MVIP conference board from Amtelco of McFarland, Wis. provided the program-controlled teleconference functions. The interface between the modem pool 108 and the voice bridge 120 was a standard two-wire telephone connection. A LAN interface card facilitated the connection between the voice bridge 120 and the front-end server 112 via the LAN 118.

In a preferred embodiment, each dedicated processor 116 is a single-board computer having a processor, RAM, ROM, a LAN interface, and optionally a separate power supply. Each dedicated processor 116 may be based on a different processor chip, and each may run a different operating system. By leaving out the hard disk, display and keyboard, the dedicated processor 116 becomes quite inexpensive. By allowing different processor chips and operating systems, each dedicated processor 116 can be optimally configured for a particular application.

As will be appreciated by those of ordinary skill in the art, different hardware and software components could be used to implement the computer system architecture according to the present invention.

The operation of the architectures shown in FIGS. 6 and 7 will now be described. The user dials into a modem pool, thereby connecting his or her modem to a modem in the modem pool. The user may or may not have voice capability. If the user has voice capability there are two slightly different possible scenarios: the voice and data streams are routed together as would be the case for the architecture shown in FIG. 6, provided a voice bridge was located on at least one of the dedicated processors or the user's voice and data streams are separated at the modem pool as would be the case for the architecture shown in FIG. 7 with a dedicated voice bridge.

The terminal server 110 is notified that a user is trying to log onto the system and it sends a message to the front-end server 112 to accept the user's data stream. The terminal server 110 then routes the user's data stream to the front-end server 112. Depending on the implementation, the last step may obviate the need for the previous message.

At the front-end server 112, the user is authenticated and the user's profile is implemented. While on the front-end server 112, the user may run non-real-time applications, such as participating in chat room discussions or accessing the World Wide Web. With reference to FIG. 7, if the user has voice capability, the user's voice stream is available for use so the front-end server 112 may send messages to the voice bridge 120. The following messages, for example, may be sent from the front-end-server 112 to the voice bridge 120: create a new voice conference and connect the user to it; connect the user to an existing voice conference; manipulate the parameters of the voice conference; move the user from one voice conference to another; disconnect the user from all voice conferences; or end a voice conference.

The user may indicate the desire to run a real-time application which may already be in progress or may need to be created. If the real-time application must be created, the following protocol is preferably invoked. The front-end server 112 sends a message to all dedicated processors 116 asking for the processors 116 to send status information to the front-end server 112. The dedicated processors 116 send messages to the front-end server 112 indicating status including their availability to accept a new application. Because the dedicated processors 116 are preferably not homogeneous, the front end server 112 then chooses an available dedicated processor 116 that is of the appropriate type and capacity to run the user's selected application. If a disk farm 114 is associated with the front-end server 112, the front-end server 112 retrieves the selected application stored in the disk farm 114. The front-end server 112 sends a message to the chosen dedicated processor 116 to accept the download of the selected application and accept the configuration for this application. The front-end server 112 downloads the selected application to the selected dedicated processor 116. The front-end server 112 also sends a message to the chosen dedicated processor 116 to accept a list of users along with profile information about them. The dedicated processor 116 sends a message to the terminal server 110 to route the user's data stream to the chosen dedicated processor 116. After the terminal server 110 obeys this command, the user is no longer connected to the front-end server 112 and is communicating directly with the selected dedicated processor 116.

If a dedicated voice bridge is used, control of the voice bridge 120 is passed to the dedicated processor which may or may not disconnect the user from the voice bridge. This happens logically at the same time as the previous message.

Alternatively, one or more disk farms may be associated with the dedicated processor 116 which can be commanded by the front-end server 112 to download a selected application to one or more particular dedicated processors 116.

During the execution of a real-time application, messaging now occurs between the dedicated processor 116, the voice bridge 120, if there is one, and the terminal server 110. The front-end server 112 is free to perform other functions.

When a user exits the real-time application, the dedicated processor 116 sends a message to the front-end server 112 to accept the user's data stream. The dedicated processor 116 sends a message to the terminal server 110 to route the user's data stream to the front-end server 112. Control of the voice bridge 120 is passed to the front-end server 112. The user is now again connected to the front-end server 112.

When a user exits from the system, the terminal server 110 sends a message to the front-end server 112 to drop the user and to the voice bridge 120 to disconnect the user from all voice conferences.

The user may connect with the front-end server 112 via methods other than the modem to modem method described above. For example, the user may connect directly via ISDN, cable modems, digital subscriber loops, satellite, or cellular. In the alternative, the user may connect indirectly, for example via the Internet.

The architectures shown in FIGS. 6 and 7 provide many advantages. First, users can be located anywhere there are telephones. Second, the number of simultaneous users of an application is limited only by the design of that application. Since one or more separate dedicated processors 116 can be dedicated to a particular application instance, the limit on the number of users may be very high. In addition, since graphics processing can be performed locally at each user station, the front-end server and dedicated processors are free to do only what they alone can do. Unlike systems that employ monolithic servers, the dedicated processors 116 can be easily changed to meet changing demand. Also, because the system provides dial-in access, the bandwidth and latency can be fixed and applications designers can optimize the applications for these conditions. Also, the architecture of the system helps to minimize the amount of data that must be sent so that the bandwidth and latency limitations are not as important.

Importantly, event contention resolution is not shared, but rather it is performed by the selected dedicated processor. Since the front-end server does not need to support the user during the execution of an application, there is no need to compromise between processor response and latency.

The architecture of the present invention has advantages over the monolithic server local access architecture and local area network architecture previously discussed because it allows users to be geographically dispersed while still in voice contact, it allows for more users in an application, and it leverages the power of individual user stations. The architecture of the present invention has advantages over the modem-to-modem architecture previously discussed because it supports more than two users per application. It also has advantages over the monolithic server packet network architecture previously discussed because its isochronous channels allow for both voice and real-time response and its pool of dedicated processors can be easily changed to meet changing demands unlike the monolithic server.

In addition, because the dedicated processors are heterogeneous, the developers can work in familiar environments, lower the cost of porting applications to this platform and the applications can be put onto the most appropriate platform.

Figure 8:
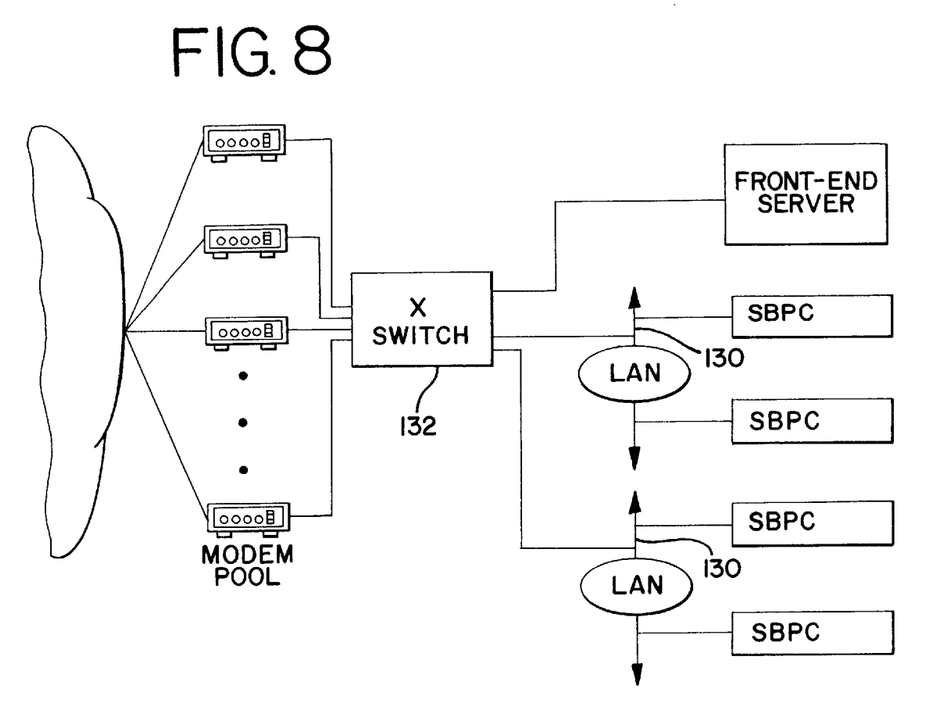
FIG. 8 is a schematic of a computer system architecture according to a third preferred embodiment of the present invention.

FIG. 8 is a schematic of a computer system architecture according to a third preferred embodiment of the present invention. Like the architecture shown in FIGS. 6 and 7, the system shown in FIG. 8 has a modem pool 108, a front-end server 112 and a plurality of dedicated processors 116. The dedicated processors 116 are divided into groups, for example, two as illustrated. Each group of dedicated processors is coupled to a LAN 130. A switch 132 couples the modem pool 108 to the front-end server 112 and LANs 130. In a preferred embodiment, the switch is a Router available from Cisco or Bay Networks. LANs 130 are preferably Ethernet LANs. While only two groups of dedicated processors are shown, many more may be provided.

Figure 9:
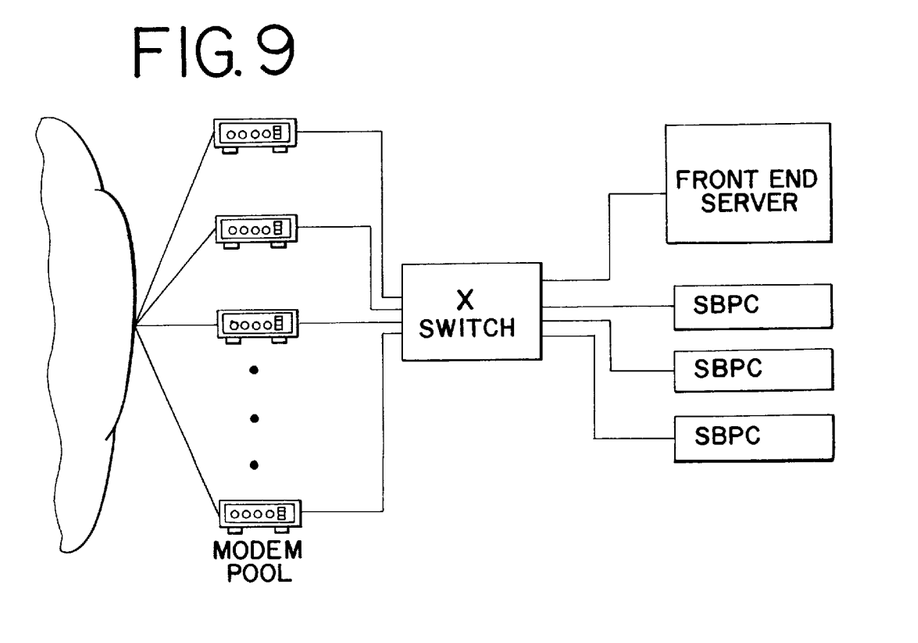
FIG. 9 is a schematic of a computer system architecture according to a fourth preferred embodiment of the present invention.

FIG. 9 is a schematic of a computer system architecture according to a fourth preferred embodiment of the present invention. The architecture shown in FIG. 9 is similar to that shown in FIG. 8 except that the LANs have been eliminated and the dedicated processors 116 are coupled directly to a switch.

It is to be understood that depending upon the application selected one or more dedicated processors may be needed to run the application. For example, a simple game may only require one dedicated processor whereas a flight simulator application may require a plurality of dedicated processors.

It is to be understood that the forms of the present invention described herewith are to be taken as preferred examples and that various changes in the shape, size and arrangement of ports may be resorted to, without departing from the spirit of the invention or scope of the claims.

What is claimed is:

1. A method for processing real-time applications which may be executed by a plurality of users, the method comprising:

providing a front-end server that has access to a plurality of applications;

providing a plurality of dedicated processors that communicate with the front-end server;

initiating communication between a first user and the front-end server;

sending a message from the first user to the front-end server that the first user desires to have executed a particular application;

retrieving the particular application selected by the first user;

downloading the particular application selected by the first user to a memory in a selected dedicated processor;

initiating communication between the first user and the selected dedicated processor; and executing the particular application selected by the user first on the selected dedicated processor.

2. A method according to claim 1 further comprising polling the plurality of dedicated processors by the front-end server to determine which one of the plurality of dedicated processors is available to execute the particular application selected by the first user before that application is downloaded to a dedicated processor.

3. A method according to claim 1 further comprising receiving voice communications from the first user.

4. A method according to claim 1 further comprising coupling a second user to the selected dedicated processor so that the second user may participate in the execution of the particular application selected by the first user.

5. A method according to claim 4 further comprising coupling additional users to the selected dedicated processor.

6. A method according to claim 1 further comprising:

providing a voice bridge coupled to the front-end server and dedicated processors; and coupling the first user to the voice bridge so that the first user may send both data and voice to the front-end server and dedicated processor.

7. A computer system architecture for processing real-time applications, the architecture comprising:

a front-end server having access to a plurality of applications;

a plurality of dedicated processors coupled to the front-end server so that the plurality of dedicated processors can communicate with the front-end server;

means for coupling a first user to the front-end server;

means for sending a message from the user to the front-end server that the user desires to have executed a particular application;

means for retrieving the particular application selected by the user and loading the particular application in a memory of the front-end server;

means for downloading the particular application stored in the memory of the front-end server to a memory of a selected dedicated processor;

means for coupling the first user to the selected dedicated processor; and means for executing the particular application selected by the first user on the dedicated processor.

8. A computer system architecture for processing real-time applications, the architecture comprising:

a front-end server having access to a plurality of applications;

a plurality of dedicated processors; and a coupler communicating with the front-end server, the plurality of dedicated processors and at least one user wherein the user first communicates with the front-end server to select a desired application and the front-end server communicates with a selected dedicated processor and downloads the desired application to the selected dedicated processor which communicates with the user and executes the desired application.

9. A system according to claim 8 wherein the coupler includes a switch coupled to a pool of modems that communicate with a plurality of users, the front-end server and the plurality of dedicated processors.

10. A system according to claim 8 wherein the coupler includes a switch coupled to a pool of ISDN devices that communicate with a plurality of users.

11. A system according to claim 9 wherein the plurality of dedicated processors are divided into groups where each group has its own LAN and each LAN is coupled to the switch.

12. A system according to claim 8 wherein the coupler includes a LAN coupling the plurality of dedicated processors in parallel with the front-end server and a terminal server coupling the LAN to either a modem or ISDN pool or packet access that communicates with a plurality of users.

13. A system according to claim 8 further comprising a voice bridge coupled to a plurality of users, the front-end-server and the plurality of dedicated processors.

14. A method for running real-time applications, the method comprising:

providing a front-end server;

providing a plurality of dedicated processors;

interconnecting the front end server with the plurality of dedicated processors so that they may communicate with one another; and by a dial-in service to access the means for interconnecting, coupling a user who dials-in to the front-end server to at least one of the dedicated processors.

* * * * *

UNITED STATES PATENT AND TRADEMARK OFFICE
CERTIFICATE OF CORRECTION

PATENT NO. : 6,175,854 B1
DATED : January 16, 2001
INVENTOR(S) : J. Bretscher

It is certified that error appears in the above-identified patent and that said Letters Patent is hereby corrected as shown below:

Drawings,
Sheet 4 of 6, Figure 6 is incorrect and should be replaced with the new drawing sheet attached hereto.

Column 8,
Line 47, "108" should be -- 122 --.
Line 59, "108" should be -- 122 --.

Column 14,
Lines 4-6, "by a dial-in service to access the means for interconnecting, coupling a user who dials-in to the front-end server" should be -- coupling a user, who dials-in to the front-end server by way of a dial-in service, --.

Signed and Sealed this

Fourth Day of February, 2003

JAMES E. ROGAN
*Director of the United States Patent and Trademark Office*